US006811860B2

(12) United States Patent
Kemp

(10) Patent No.: US 6,811,860 B2
(45) Date of Patent: Nov. 2, 2004

(54) HARDSCAPE SURFACE SHEET AND METHOD OF REPRESENTING A HARDSCAPE SURFACE

(75) Inventor: John Alan Kemp, Alpharetta, GA (US)

(73) Assignee: Oldcastle Architectural, Inc., Atlanta, GA (US)

( * ) Notice: Subject to any disclaimer, the term of this patent is extended or adjusted under 35 U.S.C. 154(b) by 92 days.

(21) Appl. No.: 10/249,314

(22) Filed: Mar. 31, 2003

(65) Prior Publication Data

US 2003/0157273 A1 Aug. 21, 2003

(51) Int. Cl.7 .................................................. B32B 3/06

(52) U.S. Cl. ........................... 428/219; 428/15; 428/99; 428/542.2; 52/313; 52/314; 52/316; 52/506.01; 52/506.05; 52/747.1; 52/747.11; 52/747.12

(58) Field of Search ............................ 428/15, 99, 219, 428/542.2; 52/313, 314, 316, 403.1, 506.01, 506.05, 747.1, 747.11, 747.12

(56) References Cited

U.S. PATENT DOCUMENTS

| | | | | |
|---|---|---|---|---|
| 4,079,554 | A | | 3/1978 | Terwilliger |
| 4,164,598 | A | * | 8/1979 | Wilhelm |
| 4,239,824 | A | * | 12/1980 | Kasten |
| 5,422,391 | A | * | 6/1995 | Inoue |
| 5,863,632 | A | | 1/1999 | Bisker |
| 6,051,292 | A | * | 4/2000 | Lind et al. |
| 6,251,480 | B1 | | 6/2001 | Jackson |
| 6,408,729 | B1 | * | 6/2002 | Johnson |

* cited by examiner

*Primary Examiner*—Deborah Jones
*Assistant Examiner*—Wendy Boss
(74) *Attorney, Agent, or Firm*—Dinsmore Shohl LLP

(57) ABSTRACT

The present invention is directed to a hardscape surface sheet and a method of representing a hardscape surface. The hardscape surface sheet comprises a substrate or sheet bearing an image of a hardscape surface. The substrate allows an individual to temporarily display the image in the area where the hardscape surface is desired and evaluate the appearance of the hardscape surface in itself, and in relation to its surroundings.

23 Claims, 1 Drawing Sheet

HARDSCAPE SURFACE SHEET AND METHOD OF REPRESENTING A HARDSCAPE SURFACE

BACKGROUND OF INVENTION

The present invention relates to hardscape surfaces and more specifically, to a hardscape surface sheet and a method of representing a hardscape surface.

In the installation of hardscape surfaces, such as patios, sidewalks, walls, etc., it is often necessary to review many types of hardscape element styles or designs to assure that the new surface matches the d é cor of the surroundings and provides an aesthetically pleasing atmosphere. Many times, this decision must be made by placing only a few actual pieces of the hardscape surface, for example bricks, in the area where the new hardscape surface will be placed. The disadvantage to this method is that it is difficult to assess a good image of the hardscape surface by placing only few samples in the area of the desired new surface.

Thus, there is a need in the art for a way to assess a hardscape surface that is economically efficient and can provide an improved image of the hardscape surface in relation to the surroundings, along with providing a good image of the pattern of the hardscape surface.

SUMMARY OF INVENTION

The present invention meets this need by providing a substrate or sheet bearing an image of a hardscape surface. The substrate is easily transportable and large enough to provide an illusion that the actual hardscape surface is present. The substrate allows an individual to temporarily display the image in the area where the hardscape surface is desired and evaluate the appearance of the hardscape surface in itself, and in relation to its surroundings.

A hardscape surface sheet is provided comprising a substrate and an outdoor hardscape surface image on the substrate. The substrate is constructed of a material that exhibits extended life in an outdoor environment. The material is sufficiently flexible to allow the sheet to conform to the contours of a surface under its own gravitational weight. The hardscape surface image is configured to create a three-dimensional illusion that the hardscape surface image is an actual hardscape surface.

A method of representing a hardscape surface is provided wherein an area is chosen where a hardscape surface is to be represented. A particular image is chosen. The hardscape surface sheet bearing the particular hardscape surface image is positioned in an area where the hardscape surface is desired to create an illusion that the hardscape surface image on the hardscape surface sheet is the actual hardscape surface.

Accordingly, it is a feature of the present invention to provide a hardscape surface sheet that will provide an improved way of temporarily displaying a hardscape surface.

DETAILED DESCRIPTION

Figure 1:
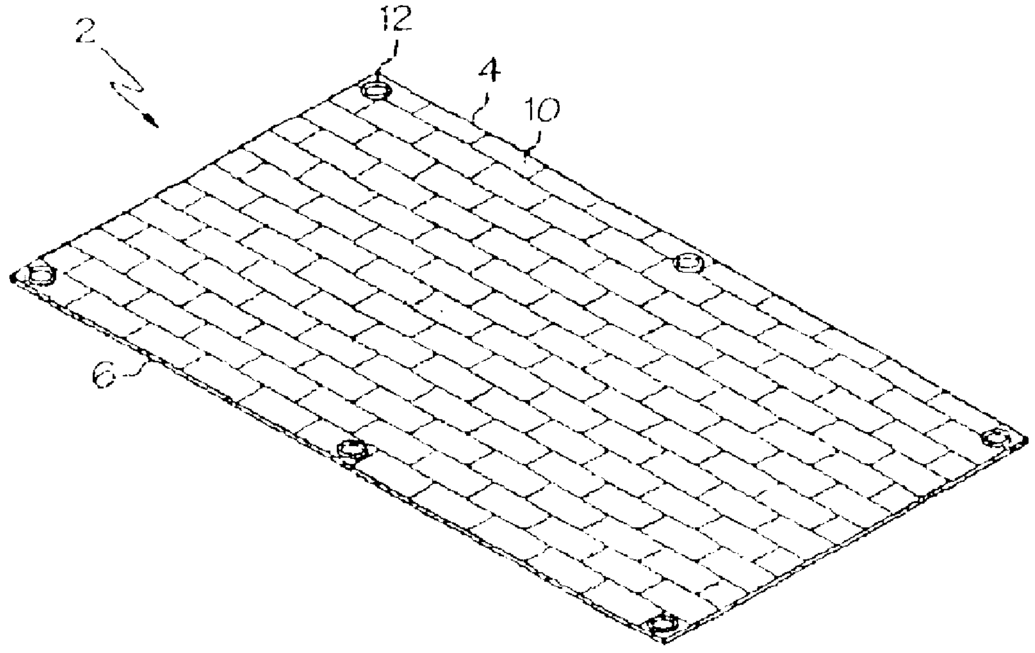
FIG. 1 is an illustration of an embodiment of the present invention.

The present invention provides a hardscape surface sheet that permits display of a hardscape surface image in the area where the hardscape surface is desired and evaluation of the appearance of the hardscape surface in itself, and in relation to its surroundings. A method for representing the hardscape surface is also provided. The representation may be utilized as a precursor to installation.

Referring to FIG. 1, a substrate 2 is provided having a first side 4 and a second side 6. An image 10 is printed on the first side 4 of the substrate 2. The substrate is typically a substantially quadrate sheet having first and second longitudinal edges substantially parallel to each other, and first and second end edges substantially parallel to each other and substantially perpendicular to the first and second longitudinal edges. Although the substrate may be a variety of sizes typically the substrate is from between about 36 inches to about 42 inches wide and from about 5 feet to about 25 feet long. The substrate is typically about 10 mils thick. Although a substantially quadrate sheet is discussed, it should be appreciated that the substrate can be any desired shape, and may include a contoured periphery.

The substrate is made from a material that can withstand extended life in an outdoor environment. Specifically, the material is such that it can be placed outdoors and endure surrounding conditions, influences, or forces while maintaining its form and stability. For example, the material should be sufficiently water resistant to withstand exposure to moisture without absorbing the moisture and losing its form. Also, the material should not fade, melt, lose its shape, or otherwise degrade with prolonged exposure to the elements, i.e. sun, wind, moisture, and temperature. By "prolonged exposure" we mean typically longer than a few hours or days.

The material should also be sufficiently flexible to conform to the contours of the surface on which it is placed. The material should be sufficiently flexible and light-weight so that it may be folded or rolled up for easy storage, handling, and transportation.

The material typically used for the substrate is vinyl, nylon, polyethylene, or combinations thereof. Suitable vinyls have a weight between about 10 oz per square yard to about 20 oz per square yard or, more specifically, between about 13 oz per square yard to about 15 oz per square yard.

Grommets 12 and other suitable hardware or fastening devices, may be provided to enable a user to secure the substrate 2 in position. For example, where grommets are used, stakes may be used to secure the substrate to a variety of surfaces. FIG. 1 shows 6 grommets, however, as many fastening devices that are needed can be used to secure the substrate 2. The material can be a sufficient weight to keep the substrate in position under moderate weather conditions without the need of fasteners. By moderate wind conditions, we mean that the atmosphere does not have to be still and calm but wind may be present.

The hardscape surface image is the image of an actual hardscape surface. By "hardscape surface" we mean surfaces such as patios, walls, and walkways as opposed to natural landscape surfaces such as earth, grass, and other living grandeover. The hardscape surface image may include bricks, stones, pavers, slabs, gravel, blocks, masonry, or any other material that can be used as a hardscape surface. The material displayed in the hardscape surface image may be patterned in any desirable manner. For example, if the hardscape surface image is an image of bricks, the bricks may be arranged in a specific pattern to appear more decorative. The image maintains its durability, color, and appearance under outdoor conditions. Specifically, the image should be sufficiently water resistant to withstand exposure to moisture without fading or smearing. Also, the image should not fade, smear, dull, or otherwise degrade with prolonged exposure to the elements, i.e. sun, wind, moisture, and temperature. By "prolonged exposure" we mean typically longer than a few hours or days. In addition, the sheet may be designed such that the image does not peel, chip, smudge, or otherwise become distorted when placed under outdoor objects, such as furnishings, outdoor equipment, and outdoor decorations. The image may be printed on the substrate by any suitable printing method that can replicate the natural appearance of the hardscape surface that is being represented.

Typically, when an individual wishes to have a hardscape surface installed, the individual will choose at least one type of hardscape surface to view in conjunction with the surrounding area. Once the hardscape surface is chosen, a hardscape surface sheet comprising a hardscape image on a substrate, is provided to the individual. The hardscape image is an image of the type of hardscape surface chosen by the individual. The second side of the substrate may be placed or positioned on a planar or contoured surface in a horizontal or vertical position. The plane surface is typically the area where a new hardscape surface will be laid, such as a patio, lawn, driveway, walk, etc. Due to the conforming characteristic of the material which forms the substrate, the hardscape surface sheet conforms to the surface. The conforming characteristic of the material operating in conjunction with the hardscape surface image may create an illusion that the hardscape surface image is an actual hardscape surface, thereby, allowing the viewer to better assess the hardscape surface image and evaluate the hardscape surface depicted in the image. The hardscape surface sheet may be placed close to or underneath outdoor objects, such as furnishings, outdoor equipment, or outdoor decorations, to allow better evaluation of the image in relation to the surrounding area. The individual may view more than one hardscape surface at a time by displaying more than one hardscape surface sheet or, in the case of a sheet with an image on each side, by flipping the sheet over.

Typically, the hardscape surface sheet is used for temporary viewing, however, the hardscape surface sheet can remain in any area for any desired length of time (e.g. a few hours, days, weeks, or more subject to the durability of the substrate and the image). When viewing of the hardscape surface sheet is finished, it can be folded or rolled up for storage or transported to another location for display due to the flexibility and weight of the substrate. Subsequently, the chosen hardscape surface may be installed in the area.

A second image may be printed on the second side of the substrate to add versatility to the substrate. The second image printed on the second side of the substrate may be the same as the image on the first side or the second image may be different. For example, if the image printed on the first side of the substrate becomes dirty or distorted, the substrate may be turned over to display the same image that is printed on the first side. In addition, the same type of hardscape surface can be displayed in the image on the second side of the substrate, but organized in a different arrangement creating a different type of hardscape surface. Also, a completely different hardscape surface may be printed on the second side of the substrate using a different type of hardscape surface and a different arrangement. Finally, a different type of hardscape surface can be shown in the image using the same arrangement as depicted in the image printed on the first side of the substrate.

Having described the invention in detail and by reference to preferred embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A hardscape surface sheet comprising a substrate and an outdoor hardscape surface image on said substrate wherein:
- said substrate is constructed of a material that exhibits extended life in an outdoor environment;
- said material is sufficiently flexible to allow said sheet to conform to the contours of a surface under its own gravitational weight;
- said hardscape surface image is configured to create a three-dimensional illusion that said hardscape surface image is an actual hardscape surface; and
- said substrate weighs between about 10 ounces per square yard to about 20 ounces per square yard.

2. A hardscape surface sheet as claimed in claim 1, wherein said material is selected from vinyl, nylon, polyethlene, and combinations thereof.

3. A hardscape surface sheet as claimed in claim 1, wherein said material is of sufficient weight such that said substrate remains in position under moderate wind conditions.

4. A hardscape surface sheet as claimed in claim 1, wherein said substrate weighs between about 13 ounces per square yard to about 15 ounces per square yard.

5. A hardscape surface sheet as claimed in claim 1, wherein said hardscape surface sheet further comprises fastening hardware.

6. A hardscape surface sheet as claimed in claim 1, wherein said hardscape surface image is configured to represent a patio.

7. A hardscape surface sheet as claimed in claim 1, wherein said hardscape surface image is configured to represent a wall.

8. A hardscape surface sheet as claimed in claim 1, wherein said hardscape surface image is configured to represent stones, brick, pavers, blocks, masonry and combinations thereof.

9. A hardscape surface sheet as claimed in claim 1, wherein said hardscape surface image is configured to represent a patterned image.

10. A hardscape surface sheet as claimed in claim 1, wherein said substrate comprises a substantially quadrate sheet having first and second longitudinal edges substantially parallel to each other, and first and second end edges substantially parallel to each other and substantially perpendicular to the first and second longitudinal edges.

11. A hardscape surface sheet as claimed in claim 1, wherein said hardscape surface sheet is between about 36 inches to about 42 inches wide and between about 5 feet to about 25 feet long.

12. A hardscape surface sheet as claimed in claim 1, wherein said substrate comprises a first side bearing a first hardscape surface image and a second side bearing a second hardscape surface image.

13. A hardscape surface sheet as claimed in claim 1, wherein said material is sufficiently durable such that said substrate may be placed under outdoor objects.

14. A hardscape surface sheet as claimed in claim 13, wherein said outdoor objects are selected from furnishings, outdoor equipment, or outdoor decorations.

15. A hardscape surface sheet comprising a substrate and an outdoor hardscape surface image on said substrate wherein:

said substrate is constructed of a material that exhibits extended life in an outdoor environment;

said material is sufficiently flexible to allow said sheet to conform to the contours of a surface under its own gravitational weight;

said hardscape surface image is configured to create a three-dimensional illusion that said hardscape surface image is an actual hardscape surface; and said hardscape surface sheet further comprises at least one grommet.

16. A method of representing a hardscape surface comprising:

choosing an area where a hardscape surface is to be represented;

choosing a particular hardscape image;

providing a hardscape surface sheet bearing said particular hardscape image;

positioning said hardscape surface sheet in an area where said hardscape surface is desired to create an illusion that said hardscape surface image on said hardscape surface sheet is said actual hardscape surface;

removing said hardscape surface sheet from said desired area; and installing in said desired area a hardscape represented by said hardscape surface image on said hardscape surface sheet.

17. A method as claimed in claim 16, wherein said method further includes the step of fastening said hardscape surface sheet to said surface.

18. A method as claimed in claim 16, wherein said area is planar.

19. A method as claimed in claim 16, wherein said area is contoured.

20. A method as claimed in claim 16, wherein said area is vertical.

21. A method as claimed in claim 16, wherein said area is horizontal.

22. A method as claimed in claim 16, wherein said hardscape surface sheet is characterized by a weight of between about 10 ounces per square yard and about 20 ounces per square yard.

23. A method as claimed in claim 16, wherein said hardscape surface sheet comprises at least one grommet.

* * * * *